United States Patent

Gramer

[15] 3,658,485

[45] Apr. 25, 1972

[54] GAS PURIFYING APPARATUS

[72] Inventor: Gottfried Gramer, Nurnberg, Germany

[73] Assignee: Siemens Aktiengesellschaft, Munich, Germany

[22] Filed: Apr. 22, 1969

[21] Appl. No.: 843,877

Related U.S. Application Data

[62] Division of Ser. No. 352,859, Mar. 18, 1964, abandoned.

[30] Foreign Application Priority Data

Mar. 20, 1963 Germany ..........................S 84243

[52] U.S. Cl. .....................................23/284, 23/2 S, 23/232, 23/255
[51] Int. Cl. ....................B01j 1/00, C01b 1/28, G01n 33/00
[58] Field of Search ..............23/284, 283, 255, 255 E, 232, 23/232 E, 2.1, 3.1, 150, 209, 230 A, 253 A, 252, 260

[56] References Cited

UNITED STATES PATENTS

| | | | |
|---|---|---|---|
| 984,605 | 2/1911 | Reichel et al. | 23/150 X |
| 2,826,480 | 3/1958 | Webster | 23/2.1 |
| 3,041,134 | 6/1962 | Weeks | 23/2.1 |
| 3,179,487 | 4/1965 | Baldus et al. | 23/2.1 |
| 3,206,414 | 9/1965 | Gunther | 23/2.2 X |

Primary Examiner—Joseph Scovronek
Assistant Examiner—Joseph Scovronek
Attorney—Curt M. Avery

[57] ABSTRACT

In a closed coolant loop of a nuclear reactor there is provided an apparatus for purifying contaminated nuclear reactor coolant gas of nuclear decomposition products, comprising filtering means for filtering a uniform flow of contaminated gas to be purified, the filtering means having components consisting at least partly of copper, gas removing means for removing a test quantity of the contaminated gas flowing through the filtering means, gas testing means connected to the gas removing means for receiving the test quantity and for analyzing the contaminating content of the test quantity, and means for selectively adding quantities of reducing and oxidizing gases to the contaminated gas so as to simultaneously regenerate the components of the filtering means as the contaminated gas is being purified.

7 Claims, 1 Drawing Figure

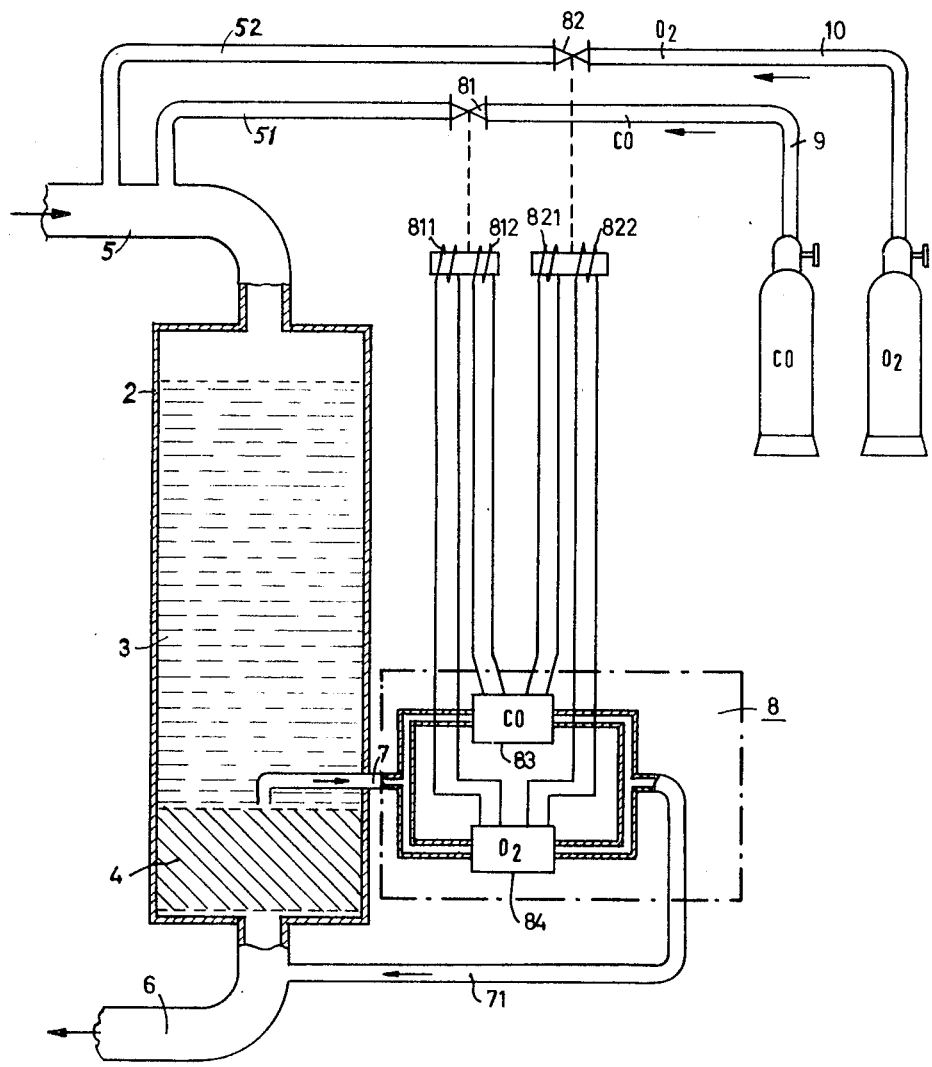

GAS PURIFYING APPARATUS

This application is a division of application, Ser. No. 352,859, filed Mar. 18, 1964, now abandoned.

My invention is related to a method and apparatus for purifying gas and particularly for purifying inert gases of nuclear reactors based on the general principles of oxidation and reduction.

It is often necessary to purify the gases that are employed in industrial processes so that they can be used repeatedly. This is particularly true for nuclear reactors in which inert gases such as helium or carbon dioxide, for example, circulate as a coolant in the primary loop. Decomposition products from the heart of the reactor, for example from the graphite moderator, and/or from the fuel elements, are entrained in such coolant gases. In addition, decomposition products also form in the coolant gases themselves due to irradiation. Furthermore, other impurities such as oxygen for example, cannot be completely removed during the original production of the coolant gas, and consequently remain in the gas when it is initially introduced as coolant. The operation of graphite moderated reactors can however be disrupted by impurities such as carbon monoxide and oxygen for example.

It has been the general practice in the past to provide two filter beds for the oxygen reduction and two filter beds for the carbon monoxide oxidation for example. While one filter bed for each of the above-mentioned purposes is in operation, both of the other beds remain in reserve or are being regenerated. When only the oxygen in the carbon dioxide that is to be supplied has to be removed, the standing periods of the copper oxide filters for removing carbon monoxide is about 100 hours as against about 9,000 hours for the removal of oxygen by the copper filters. Only at initial start-up of a reactor is one at all concerned with a higher oxygen content in the coolant gas, the high oxygen content being caused by air which is absorbed through the walls of the pipe lines and through equipment built into the pipe lines, and also due to incomplete rinsing or flushing with the coolant gas. In the start-up condition of a reactor essentially only the copper bed is subjected to a work load, whereas, quite contrarily during the subsequent operating period only the copper oxide bed is subjected to a work load.

During the different operating conditions, therefore, only half of the installed filter beds are usable at a time. In addition to this disadvantage, the regeneration of the copper oxide beds necessitates a great additional servicing expense and takes about 20 hours. It is accordingly evident therefrom, that if a premature failure of an installed filter bed occurred, the second filter bed might be in the process of being regenerated and would not be available as a substitute so that it appears to be urgently necessary to furnish a third filter bed as a safety measure in order to avoid such a difficult situation.

It is accordingly an object of my invention to provide an apparatus and method of purifying gas which largely avoids the above-described disadvantages of the known methods and apparatuses.

With this aim in view and in accordance with my invention I provide an apparatus and method of purifying gas in which the gas which is to be purified is led at a temperature of about 150° to about 800° C. over a filter bed of copper and copper oxide bearing particles, while oxygen, carbon monoxide or hydrogen gas and any mixtures thereof are supplied during the processing period for regenerating the filter, depending on the degree of purity of the gases passing therethrough in a particular region thereof.

The apparatus for carrying out the method of my invention comprises a single filter bed of copper particles or particles containing copper oxide or both which is disposed in a constant-temperature container. The filter particles advantageously consist of porous sintered bodies, for example in tablet or spherical form, made of copper, copper oxide or both, which have a very large effective outer surface. This construction of the filter bed ensures a large capacity and mechanical stability, and moreover especially ensures the use of the filter bed under very high pressures. There are no gases given off by regeneration and/or condensation products that might possibly become radioactive. As a matter of fact, regeneration of the filter bed takes place during the gas purifying process so that this apparatus is distinguished by its great operational safety, constant availability and by the fact that it has only a minimal servicing cost.

This apparatus is not only suitable for recombination of carbon monoxide and the removal of oxygen but also for recombination of gases such as hydrogen and oxygen which are formed by radiolysis. Such use is particularly of interest for heavy-water moderated reactors whose protective gas cushion normally consisting of helium has to be constantly purified of such radiolysis products.

Other features which are considered as characteristic for my invention are set forth in the appended claims. While my invention has been illustrated and described as a method and apparatus for purifying gas, it is not intended to be limited to the details shown, since various modifications in both the method and apparatus may be made without departing in any way from the spirit of the present invention. Such adaptations should, and are intended to be comprehended within the meaning and range of equivalents of the claims.

The invention, however, both as to the construction of the apparatus and method of operation, as well as the additional objects and advantages thereof, will be best understood from the following description of a specific embodiment when read in connection with the accompanying single FIGURE diagrammatically showing the apparatus of my invention.

Referring now to the FIGURE, there is shown a container 2 in which there is located a filter bed having two regions 3 and 4. The region 3 contains a mixture of copper particles and particles containing copper oxide while the region 4 only contains copper particles. As aforementioned the copper and copper oxide bearing particles are porous and sintered. The particles may also consist of ceramic material having vapor-deposited layers of copper and copper oxide or both. The gas which is to be purified is led from above through the supply conduit 5 to the container 2, passed downwardly through the filter bed, and discharged through the conduit 6. In the boundary region of zones 3 and 4 there is located a gas removal device 7 which conducts a small portion of the purified gas to the gas testing apparatus 8. This gas testing apparatus is operatively connected to the regulating valves 81 and 82 in the conduits 51 and 52, respectively, which discharge into the supply conduit 5 and which, in accordance with the determinations made by the gas testing apparatus 8, in a manner hereinafter described, supply additional gases 9 and 10 such as carbon monoxide and oxygen for example, to the gas that is to be purified.

The layer 4 of the filter bed does not for all practical purposes participate in the purifying process of the filter bed and has the sole object of ensuring the removal of any possible over-supply of oxygen prior to the incidence of the control operation by the gas testing apparatus 8.

The gas testing apparatus 8 comprises gas analyzers 83 and 84 which are both connected to the gas removal conduit 7. After being tested the gas is returned through the conduit 71 to the discharge conduit 6. The analyzer 83 tests the gas for its carbon monoxide content while the analyzer 84 tests for oxygen content. The analyzers proper are commercial recording devices such as are made by Beckman Instruments or Hartmann & Braun, for example. The valves 81 and 82 are magnetically controlled, and each of them is provided with two coil windings 811 and 812 for valve 81 and 821 and 822 for valve 82 for opening and closing the same. The windings 811 and 822 are connected to the oxygen analyzer 84 and the winding 812 and 821 are connected to the carbon monoxide analyzer 83.

The operation of this described assembly is as follows:

The gases carbon monoxide and oxygen to be added in the gas purifying process are obtained from pressurized tanks or bottles, whereby for the purpose of simplification the gas flow is shown as being adjustable by pressure-reducing valves mounted on the pressurized bottles. If the analyzer 84 for example measures a quantity of 5 vppm of $O_2$ or more, then the magnetic valve 81 is opened by means of the winding 811 and carbon monoxide gas is supplied to the primary gas circulation loop. If the oxygen content of the gas being tested drops so low that it no longer measurable, then the winding 811 is energized, that is the valve is readied for closing. Since, however, the analyzer 83, on the other hand, does not indicate any carbon monoxide yet, the valve 81 still remains open. Only if the carbon monoxide content rises to about 10 vppm, for example, is the coil 812 energized by the analyzer 83 so that the valve 81 for supplying carbon monoxide closes. If after a predetermined period, such as 1 minute for example, the carbon monoxide content does not drop to an immeasurable value, then the magnet coil 821 is energized so that the magnetic valve 82 opens and oxygen is supplied to the primary gas loop. As soon as no carbon monoxide is indicated any more in the analyzer 83, the valve 82 is immediately closed. Independently therefrom it is also however immediately closed if oxygen is detected in the discharging $CO_2$ gas by the analyzer 84 during this operation.

My method of gas purifying is carried out in the following manner:

It is assumed that the gas to be purified is coolant gas of a nuclear reactor, such as carbon dioxide for example. In the start-up condition, as has been previously mentioned, only a very slight amount of carbon monoxide is present in the coolant gas whereas the oxygen content is relatively high. This oxygen combines in the filter bed with the copper particles whose outer surface becomes covered with a layer of copper oxide. If the capacity of the filter bed is insufficient to absorb the oxygen content completely, a fact which is automatically determined by the gas testing apparatus 8, then the regulating valve 81 is thereby opened and additional carbon monoxide is fed into the coolant gas stream. A portion of the copper oxide coated particles is accordingly regenerated by being reduced to copper and the carbon monoxide is oxidized to carbon dioxide. Consequently, there is afforded an increased copper surface for removing the oxygen in the coolant. During the period of operation this excessive content of oxygen is no longer present, as it is overbalanced by the content of carbon monoxide. With such an operating condition it is necessary therefore at times to supply small quantities of oxygen in amounts automatically regulated by the gas testing apparatus 8 through the control valve 82. In this manner, for every operational condition of the reactor, equilibrium or balance between the copper and copper oxide particles in the filter bed is maintained. In other words, the process of gas purifying and the regeneration of the filter bed takes place simultaneously and parallel with one another.

In a similar manner, the purification of gases can lead to the appearance of hydrogen and oxygen as radiolysis products. In such a case the hydrogen reduces the copper oxide particles and is thereby self-oxidized to water while the oxygen re-oxidizes the reduced filter component to copper oxide. The gas purifying process in such a case is also supervised and controlled by the gas testing apparatus 8. Naturally, in the last-mentioned case, hydrogen and oxygen in an amount regulated by the gas testing apparatus is supplied instead of carbon monoxide and oxygen.

It often becomes necessary for a portion of the impurity to be retained in the gas during the purifying process, such as carbon monoxide in carbon dioxide for example. In such cases formerly the processing apparatus would be periodically shut off. In accordance with the method and apparatus of my invention, quite to the contrary, a suitable adjustment takes place at the gas testing apparatus so that the equilibrium between or the relative proportion of the copper and copper oxide components is shifted toward one or the other thereof and, consequently, complete recombination of the carbon monoxide for example, can be prevented. It is therefore possible by simple pre-selection of the degree of purity at the gas testing apparatus to regulate accurately the composition of the gases leaving the filter bed 2.

The filter bed proper can accordingly be about 150 centimeters in length and 40 centimeters in diameter. Additional data regarding the process is that the gas velocity with reference to the empty container is about 10 to 20 centimeters per second, which, for the given example of filter bed measurements, indicates an interval of between 15 and 7.5 seconds during which the gas is in the filter bed. The gas purification process is consequently very rapid whereby a very high efficiency is achieved accordingly.

It has been found for example that an initial oxygen content of 600 vppm (volumetric parts per million) in carbon dioxide can be reduced by my method and apparatus to a detectable limit of about 10 vppm, that is, that in the purified gas the oxygen content can no longer be ascertained or measured. Similar results were obtained with carbon monoxide whose initial content amounted to about 1,200 vppm. The sintered substance used in the process to which the foregoing data apply consisted almost entirely of the oxide form, nevertheless satisfactory operation was obtained. The operating temperature was 200° C. at a pressure of 1 atmosphere, from which it can be concluded that this method of gas purifying is carried out with relatively simple apparatus that is accordingly relatively easy to operate and is therefore less susceptible to breakdown. Due to the simultaneous completion of the gas purifying process proper and the regeneration action, there is no likelihood of exhausting the filter substance so that a lengthy period of operation is available, which makes regular changes in the operation or interruption thereof unnecessary. It is particularly advantageous that no residue gases, which might be radioactive under certain conditions, can be set free. Instead, all of the residue gases including the added gases remain in the gas stream.

Naturally, in addition to the aforementioned gases it is also possible to purify other gases when the products involved are hydrogen, carbon monoxide or oxygen. In graphite moderated nuclear reactors with noble gases as coolants, carbon monoxide can also be produced for example. Also in the case of water-moderated and gas-cooled nuclear reactors, hydrogen and oxygen may appear in the coolant gas, because of leaks and may accordingly be removed in the same manner as carbon monoxide and oxygen. Naturally, the gas purifying method and apparatus of my invention are not limited to the aforedescribed examples and embodiments and can be employed also under other circumstances or conditions, for example, when organic coolants are used and when the working steam is directly superheated in the reactor.

In this connection it should be noted that it is possible in accordance with the described method and apparatus of my invention to decompose hydrocarbons, such as methane for example, contained in a working gas such as carbon dioxide, into carbon dioxide and water and thereby to purify the gas circulating loop. In such a case, the operating temperature is about 800° C.

I claim:

1. In a closed coolant loop of a nuclear reactor, apparatus for purifying contaminated nuclear reactor coolant gas of nuclear decomposition products, comprising filtering means for filtering a substantially continuous flow of contaminated gas to be purified, said filtering means having components consisting at least partly of copper, gas removing means for removing a test quantity of the contaminated gas flowing through said filtering means, gas testing means connected to said gas removing means for receiving said test quantity and for analyzing the contaminating content of said test quantity, and means for selectively adding quantities of reducing and oxidizing gases to the contaminated gas so as to simultaneously regenerate the components of said filtering means as the contaminated gas is being purified.

2. Apparatus according to claim 1 wherein the components of said filtering means are in the form of porous sintered elements.

3. Apparatus according to claim 1 wherein the components of said filtering means are in the form of ceramic elements with vapor-deposited layers consisting at least partly of copper.

4. Apparatus according to claim 1 wherein said filtering means has an inlet and outlet for the flow of the gas to be purified, said gas removing means removing said test quantity from a location intermediate said inlet and outlet, and said components of said filtering means upstream of said gas removing location being in the form of particles.

5. In a closed coolant loop of a nuclear reactor, apparatus for purifying nuclear reactor coolant gas of nuclear decomposition products comprising circulating means for circulating the coolant gas to be purified, filtering means connected in said circulating means for filtering the coolant gas, said filtering means comprising copper and copper oxide bearing components, gas removing means for removing a test quantity of the coolant gas passing through said filtering means, gas testing means connected to said gas removing means for receiving said test quantity of the coolant gas and for analyzing the impurity content of said test quantity, and means for selectively adding quantities of oxygen and hydrogen to the coolant gas before it passes through said filter means so as to simultaneously regenerate said components as the coolant gas is being purified.

6. In a closed coolant loop of a nuclear reactor, apparatus for purifying a nuclear reactor coolant gas of nuclear decomposition products comprising circulating means for circulating the coolant gas to be purified, filtering means connected in said circulating means for filtering the coolant gas, said filtering means comprising copper and copper oxide bearing components, gas removing means for removing a test quantity of the coolant gas passing through said filtering means, gas testing means connected to said gas removing means for receiving said test quantity of the coolant gas and for analyzing the impurity content of said test quantity, and oxygen and carbon monoxide supply means connected with said circulating means, said supply means being controlled by said gas testing means in accordance with the analysis of said test quantity for selectively adding quantities of oxygen and carbon monoxide to the coolant gas in said circulating means before it passes through said filter means so as to simultaneously regenerate said components as the coolant gas is being purified.

7. In a closed coolant loop of a nuclear reactor, apparatus for purifying a nuclear reactor coolant gas of nuclear decomposition products in the primary coolant loop of nuclear reactors comprising filtering means connected in the primary loop for filtering the coolant gas, said filtering means comprising a bed of copper and copper oxide bearing particles, gas removing means for removing a test quantity of the coolant gas passing through said bed of particles, gas testing means connected to said gas removing means for receiving said test quantity of the coolant gas and for analyzing the impurity content of said test quantity, oxidizing gas and reducing gas supply means, conduit means connecting said supply means with the primary loop of a nuclear reactor, valve means provided in said conduit means and controllable by said gas testing means in accordance with the analysis of said test quantity for selectively adding quantities of oxidizing gas and reducing gas to the coolant gas in the primary loop before it passes through said filter means so as to simultaneously regenerate the particles of said filtering means as the coolant gas is being purified.

* * * * *